Dec. 15, 1936.   R. H. WHITEHEAD   2,064,043
ELECTRIC TIMING MECHANISM
Filed Feb. 3, 1932   3 Sheets-Sheet 1

INVENTOR
Richard H. Whitehead
BY
Watson, Bristol, Johnson & Leavenworth
ATTORNEYS Dec. 15, 1936.                R. H. WHITEHEAD                2,064,043
                        ELECTRIC TIMING MECHANISM
                    Filed Feb. 3, 1932            3 Sheets-Sheet 2

INVENTOR
BY Richard H. Whitehead
Watson, Bristol, Johnson & Leavenworth
ATTORNEYS Dec. 15, 1936.     R. H. WHITEHEAD     2,064,043
ELECTRIC TIMING MECHANISM
Filed Feb. 3, 1932     3 Sheets-Sheet 3
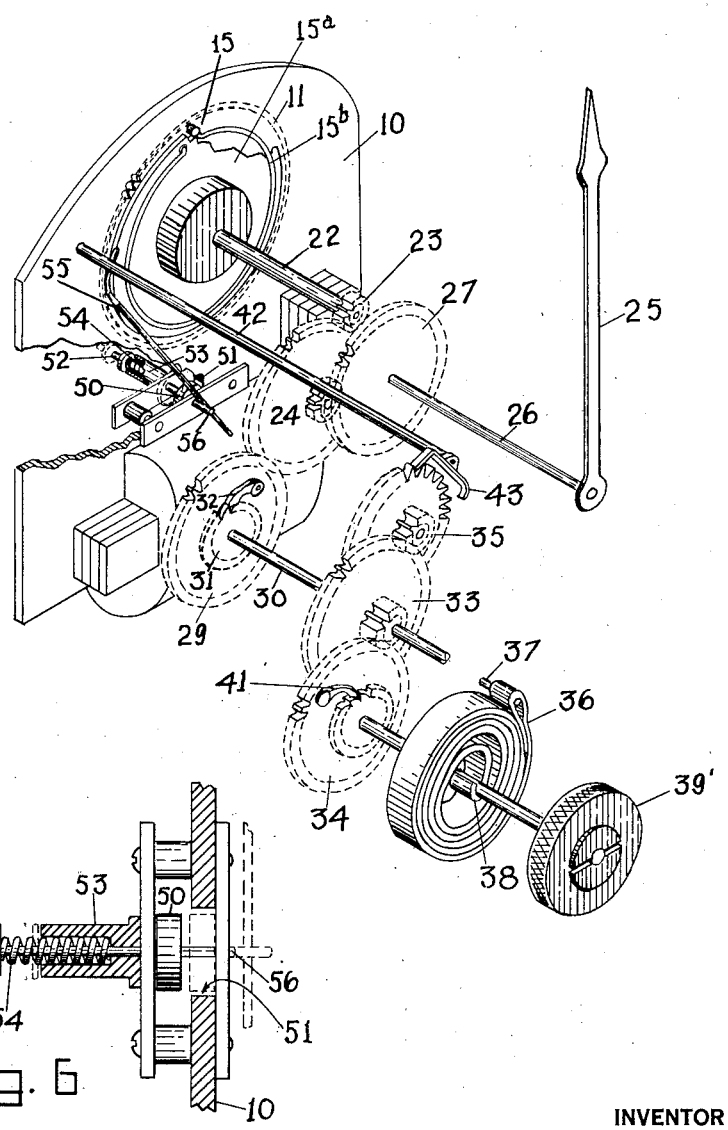

Patented Dec. 15, 1936

2,064,043

UNITED STATES PATENT OFFICE 2,064,043

ELECTRIC TIMING MECHANISM

Richard H. Whitehead, New Haven, Conn., assignor to The New Haven Clock Co., New Haven, Conn., a corporation of Connecticut Application February 3, 1932, Serial No. 590,598

5 Claims. (Cl. 58—26)

This invention relates to electric timing mechanisms and with regard to its more specific features to electric clocks.

It is an object of this invention to provide a new and improved device of the character referred to which will be simple to construct, economical to manufacture and efficient in operation. In the manufacture of electrical timing instruments, such as electric clocks, control switches, meters and the like, small synchronous motors may be employed to take their timing directly from the alternations of the electric power supply. Such motors cease to operate if the electric current should fail for any reason, even momentarily, and if the electric motors be of a non-self-starting type, they will not resume operation after the interruption when the current again comes on the line.

It is an object of this invention to provide an electric motor capable of responding synchronously to the alternating current, with means for maintaining the speed of said motor during lapses in the electrical power. In this manner it is possible to connect the motor directly with the clock hands so as to be at all times controlled thereby, without the employment of a ratchet mechanism between them.

Some of the simplest and most efficient and otherwise desirable of these small motors are not self-starting. This has heretofore had the disadvantage for many purposes that a momentary interruption on the line will stop the motor for good.

It is a further object of this invention to make it possible to use a non-self-starting motor without this drawback, by maintaining a sufficient speed of the motor during lapses of power on the line, to enable it to fall into synchronism without having to start, when power comes on the line.

It is a further object to produce, in a device of the kind just described, mechanism for controlling the speed of operation of the devices while driven by the auxiliary driving means so as to keep the motor at a speed equal to synchronism and the timing device in proper time during said lapses in power.

It is a further object in such a device to provide means responsive to the presence or absence of the electric power for stopping or starting the auxiliary driving means so as to cause it to operate only during the lapses of power.

To attain this latter end, it is a further object to employ an isochronous device which is magnetically controlled in a position of instability by the power of the synchronous motor whereby when the power is lacking, the isochronous device will start operating at once.

It is a further object of this device to provide a motor which is economical to construct, efficient and reliable in operation and which will be of such slow speed that it is practical to drive the motor from an auxiliary source of power such as a spring motor.

Other objects of the invention will in part be obvious and will in part appear hereinafter.

The invention accordingly comprises the features of construction, combinations of elements, and arrangements of parts, which will be exemplified in the construction hereinafter set forth and the scope of the application of which will be indicated in the claims.

Many features of my invention may be employed with a self-starting motor, but it is here illustrated in connection with a non-self-starting motor as some of the features are more directly concerned therewith and have special relation thereto.

Moreover, in accordance with many features of this invention, it is contemplated to maintain the rotor of the synchronous motor in operation at, or substantially at, synchronous speed during lapses in the line power. This involves a gear reduction between the rotor and the driven mechanism which is of higher ratio the higher the speed of the motor. In driving the rotor through this gearing, the friction increases as the gear ratio becomes higher. On this account it is desirable to construct the motor to run at as low a speed as practical to reduce the auxiliary power required to maintain the speed during the power lapses.

It is a further object to create a mechanism which when desired can be constructed to continue to maintain the motion of the clock during power lapses for only a short predetermined time and thereafter will not again cause the power to resume after a lapse. In this manner if the lapse is momentary, the clock will continue to operate, but if the aggregate of all the lapses is more than a fixed maximum, the clock will indicate that fact by stopping.

For a fuller understanding of the nature and objects of the invention, reference should be had to the following detailed description, taken in connection with the accompanying drawings, in which:—

Figure 5 is a perspective view similar to Figure 4 but showing a modified construction.

Figure 6 is a detail plan view, partly in section, of the escapement stopping device of the construction shown in Figure 5.

Figure 1:
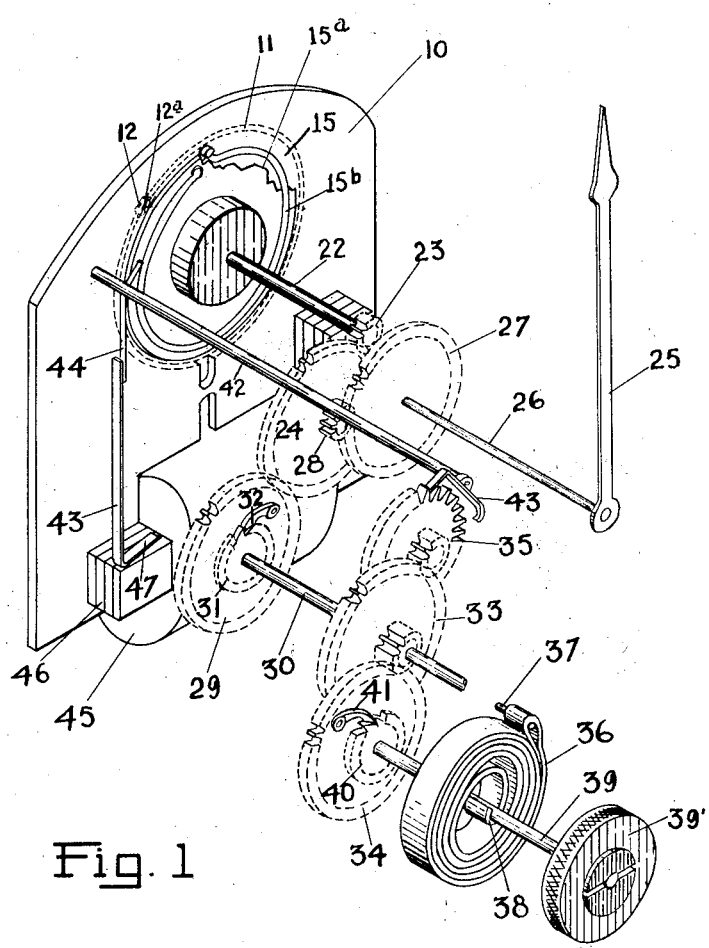
Figure 1 represents a perspective view of a device embodying this invention.

In the drawings the numeral 10 designates a supporting plate of highly magnetizable iron having an opening 11 cut therein, provided with teeth 12 upon its inner surface, these teeth being preferably of such number that the speed of the rotor, moving one tooth at a time for each alternation, will have a slow fixed integral speed. The motor has generally been made with the teeth spaced three degrees apart from center to center. Within the opening there is provided a plate 15 so journalled as to rotate centrally within the opening 11 and this plate is in the form of a disc which ordinarily has a number of teeth 12a equal to the number of teeth 12 of the stator whereby they may all be brought simultaneously into alignment.

With such a construction the maintenance of magnetism within the disc to cause a sufficient leakage flux across the opening 11, will keep the rotor moving at synchronous speed, if it is brought to that speed by any means, or if rotating near that speed when current is applied. Each tooth on the rotor will move from one tooth to the next, on the stator, during each alternation.

Figure 2:
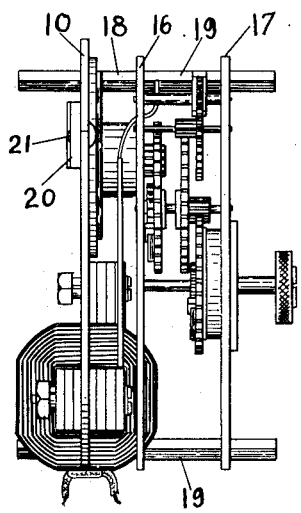
Figure 2 represents a side elevation of the device.
Figure 3:
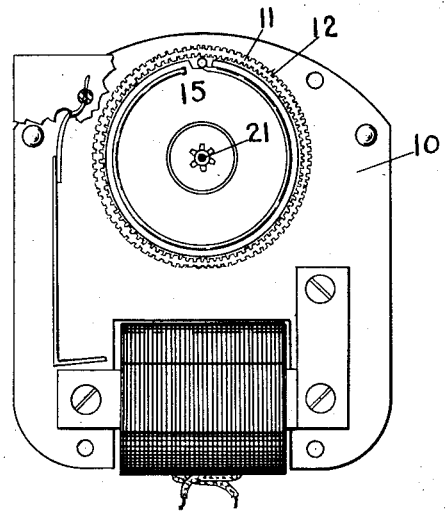
Figure 3 is a front elevation thereof.
Figure 4:
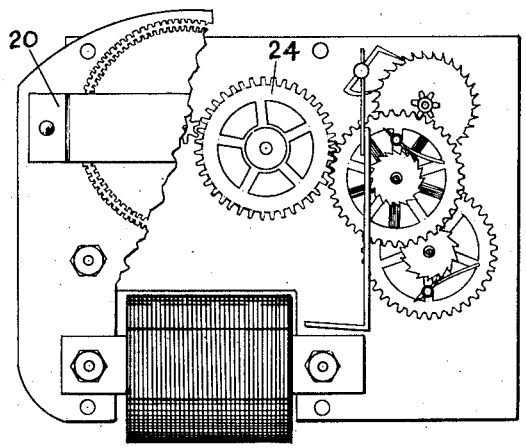
Figure 4 is a diagrammatic rear elevation thereof, diagrammatic to the extent that some of the supporting plates have been omitted for the sake of showing the relationship of the parts.

As illustrated in Figures 2, 3 and 4, the mechanism is, in part, carried by supporting plates 16 and 17 which are held in suitable spaced relation to each other and to the plate 10 by spacing columns 18 and 19. A strap 20, attached to the plate 10, carries a stud shaft 21 which serves as a journal for the rotor 15.

This construction greatly facilitates the bringing of the motor into step with the current and the maintenance of synchronous speed and it makes any dampener unnecessary. When desired, however, as an additional precaution, such a dampener may be used. As illustrated the rotor 15 is loosely but frictionally mounted on a dampening device 15a to which it is resiliently connected by a spring 15b. The dampening device 15a has a hollow shaft 22 through the medium of which it is journalled upon the stud 21 and this shaft 22 carries at its outer end a pinion 23 which meshes with a gear 24 journalled in the plates 16—17. This construction is disclosed and claimed in the copending application #409,809, filed Nov. 26, 1929 of myself and Wilson E. Porter.

The time indicating hands, only one of which is shown, are marked with the numeral 25. It will be understood that a suitable gear connection for running the other clock hands will be employed, but since this forms no novel part of the present invention, it is not necessary to show or describe it in detail. This hand 25 is carried by a shaft 26 which is driven by a gear 27 from a pinion 28 attached to the gear 24. The parts 25, 26, 27 and 28 have been omitted from the other figures of the drawings to simplify the disclosure.

The gear 24 meshes directly with a gear 29 loose upon a shaft 30 also journalled in the plates 16 and 17. The gear 29 is operatively connected with the shaft 30 through the medium of a ratchet 31 upon the shaft and a pawl 32 upon the gear which cooperate in a direction to permit the driving of the clock train in the forward direction from the shaft 30 but to permit the stopping of the shaft 30 without thereby stopping the synchronous motor.

The shaft 30 carries a gear 33 which serves as an intermediate member between a gear 34 and an escapement wheel 35. The members 33 and 34 constitute a train of gearing connecting a spring 36 with the escapement wheel 35, to permit the escapement to control the speed of release of the spring. As illustrated the spring 36 is fixed at its outer end as shown at 37 and is attached at its inner end 38 to its shaft 39 and this shaft 39 is provided with a handle 39' and is operatively connected to the gear 34 by a ratchet 40 and pawl 41 for winding purposes.

A shaft 42 carries at one end an escapement anchor 43 which cooperates with the escapement wheel 35 to form the escapement. This shaft cooperates at its other end with an isochronous element to control the speed of release of the spring power. Means are also provided to prevent the operation of the spring power while the electric power is operating the motor. A very practical form for accomplishing this result consists in utilizing the stray magnetic field of the synchronous motor for holding the isochronous device from moving. The isochronous device may consist of a pendulum or a balance wheel and an element may be provided, responsive to the stray field of the motor, for obstructing the operation of the spring power so long as electric power is supplied to the synchronous motor.

In many power houses the line interruptions are of extremely short duration and of infrequent occurrence. For such situations great accuracy in the speed of the synchronous motor during the power lapses is not required. It is possible, therefore, under such circumstances, greatly to simplify the mechanism, reducing its cost and increasing its reliability by utilizing the isochronous device as the means for controlling the motor as here shown. In this form as illustrated in Figures 1–4 an armature 43 is connected directly to the escapement shaft 42, preferably by means of a resilient strip 44 and is held by the shaft in a manner to permit its position to be varied in the stray flux of the motor field. This armature swinging back and forth with the oscillation of the shaft 42 serves as a pendulum to control the speed of the escapement.

The speed of operation of the escapement within reasonable limits may be adapted to the purposes for which the clock is intended, but under many circumstances where power lapses are few and short, it is desirable to have the normal speed of the motor when operated by the auxiliary motor a little above true synchronous speed, perhaps about a few percent above so that although maintained at substantially synchronous speed, it will nevertheless pass into synchronous speed as the motor tends to slow down.

This construction also makes possible the stopping of the auxiliary drive when the total cumulative value of the power lapses exceeds a predetermined value. For example, the spring may be adjusted to maintain the operation of the motor at substantial synchronism whether the electrical power is on or off, until the total time of power failure has equalled fifteen minutes. Thereafter if the power again fails, the motor will stop until reset. This is a feature of importance as it prevents too long an operation on the auxiliary power.

The motor itself is energized by a coil 45 which is set into the plate 10, as shown, and which carries within it a number of rectangular magnetic plates which make firm contact with the plate 10 at the ends of the coil and serve as a core 46, to reduce the reluctance of the magnetic path through the coil. At the ends of this core there is some leakage magnetic flux which may conveniently be utilized to control the armature 43.

To avoid actual contact between the armature 43 and the core 46 while at the same time providing the minimum of magnetic reluctance between them, the lower end of the armature 43 may be bent inwardly toward the coil 45 as shown at 47 and it may conveniently be bent along the arc of a circle, having its center in the axis of the shaft 43, but the end 47 is spaced sufficiently from the core 46 to prevent any actual contact between them, even under the influence of a strong magnetic field.

It will be seen that the general shape of the plate 10 and the location of the opening 11 leaves a comparatively narrow band of metal between the opening and the top of the plate. This reduces the magnetism short-circuited by the plate between the two poles set up on opposite sides of the opening, by the magnetizing coil.

For a similar purpose the plate 10 may be cut away as shown at 50 to control the degree of flux short-circuited by the plate at that point.

In the modification shown in Figure 5 the principal parts of the device function in the same manner as in the form shown in Figure 1 and these parts are therefore numbered with the same numbers as the corresponding parts in Figure 1. As will be seen, the spring 36 wound by the handle 39' drives a shaft 30 and through it drives the rotor 15 through the ratchet 32 whenever permitted to do so by the escapement 43.

In this form of the device, however, the means for arresting the movement of the escapement in response to the actuation of the electrical coil is somewhat different. There is here provided a small circular magnetic disc 50 to fit into a circular opening 51 in the plate 10 preferably at a point between the coil 45 and the rotor 15 where the density of magnetic flux is the greatest. This disc 50 is carried by an axially disposed pin 52 slidably mounted in a small casing 53 attached to the plate 10, this construction being such as to permit the disc 50 to fit neatly within the opening 51 of the plate without touching it upon either side, or to be moved along its axis out of the plane of the plate 10. The spring 54 is arranged to urge the disc outwardly out of the plane of the plate 10 and it remains in this position during all of the period when the current is off. As soon, however, as the coil 45 is energized, the disc 50 is drawn within the orifice 51 into the plane of the plate 10 and is held there by the leakage magnetic flux across the orifice.

Mounted upon the shaft 42 of the escapement 43 is a strip 55 which during operation of the escapement 43 moves back and forth across the axial line of the pin 52 and this pin 52 is long enough and is so positioned that when the disc 50 is drawn into the orifice 51, the projection 56 of the pin 52 passes outwardly enough to intercept the movement of the strip 55 thereby locking the escapement against movement. In the event and as soon as current fails on the line, however, the disc 50 is drawn out of the plane of the plate 10 and the projection 56 is correspondingly drawn out of the pathway of the strip 55.

Obviously any form of isochronous element may be employed to control the escapement in this, as in the other form of the device, but where a high degree of isochronism is not required, this strip 55 like the armature 43 of the previously described construction may itself constitute the isochronous element.

It will thus be seen that the device functions substantially similarly to the construction of the other form of the invention in that the movement of the ratchet escapement is controlled by the stray flux of the motor to cause the clock train automatically to take up the motor drive as soon as the power goes off the electric motor.

It will be clear that with either of the above constructions the pole pieces of the motor may all be stamped at one operation upon a single piece of metal. This has the effect of eliminating the difficulty of obtaining registry between the teeth and it maintains them all in position. This has a further advantage that the reactance of the coil, which is in part limited by the commercial wire sizes, may be increased by the short-circuited flux thereby reducing the power consumption and at the same time enabling a greater number of stator teeth to be brought into registry with the rotor teeth, with a better flux distribution between them.

In constructing a slow speed motor the proportion of the parts becomes of some importance and the strength of the field flux across the air gap should be adjusted to the weight and dimensions of the rotor. A practical size of motor to operate satisfactorily in a clock may have the following approximate dimensions:

| | |
|---|---|
| Thickness of stator plate_____inches__ | 3/64 |
| Diameter of rotor_____do____ | 1 and 5/8 |
| Air gap between teeth points____do____ | .007 |
| Depth of magnetic shunt at top of rotor_____do____ | 5/64 |
| Depth of magnetic shunt between coil and rotor_____do____ | 5/64 |
| Coil wound to consume_____watts__ | 2 |

Such a motor will maintain its synchronous speed under a clock load under wide variations of voltage.

With the above construction the operation of the device will be clear. The device may be started by winding the spring 36 which starts the motor in motion. It may then be connected to the power line, and the synchronous motor, falling into step, takes up the drive. Thereafter, so long as the current is on the coil 45, the rotor 15 being in rotation, the armature 43 will be held to the right as shown in Figure 1, preventing the operation of the escapement 35 and holding the shaft 30 stationary. During this period the clock is operated by the synchronous motor. As soon, however, as power fails in the coil 45, the armature 43 is released and either under the operation of gravity or under the operation of the escapement wheel 35 it is caused to move back and forth like a pendulum. During this time the movement of the shaft 30, through the ratchet and pawl 31 and 32, picks up the motor and carries it along together with the clock itself at synchronous speed.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:—

1. A device of the character described comprising, in combination, a synchronous motor having a rotor and field, a clock so connected to said motor as to cause said motor and clock to rotate together at a speed ratio which is at all times fixed, a spring motor connectable for operating said rotor, an isochronous element for controlling the speed of operation of said spring motor to maintain for said rotor a speed substantially equal to synchronous speed, including an element having a magnetic part within the control of the field of said synchronous motor adapted to stop operation of said spring motor when said field is energized.

2. A device of the character described, comprising in combination, a synchronous motor, a clock train so connected to said motor as to cause said motor and clock to rotate together at a speed ratio which is at all times fixed, a spring motor, connections including a ratchet for driving said synchronous motor from said spring motor, a timing device for controlling the speed of release of said spring motor including an escapement and an isochronous element having a magnetic part within the magnetic influence of said synchronous motor to stop the movement of said isochronous element when power is supplied in the electrical system supplying power to said synchronous motor.

3. A device of the character described comprising, in combination, a synchronous motor, a time train driven by said motor, a spring motor releasably connected to drive said time train when the electrical power to drive said synchronous motor fails, a timing device for controlling the speed of said spring motor including an isochronous element having a magnetic part within the magnetic influence of the synchronous motor in position to be attracted thereby to prevent the operation of said spring motor while power is on the synchronous motor.

4. A device of the character described comprising, in combination, a synchronous motor, a time train driven by said motor, a spring motor releasably connected to drive said time train when the electrical power to drive said synchronous motor fails, a timing device for controlling the speed of said spring motor including a pendulum having a magnetic portion within the magnetic field of the synchronous motor in position to be attracted thereby, whereby the operation of the synchronous motor will prevent the operation of said spring motor while power is on the synchronous motor.

5. A device of the character described comprising, in combination, a clock train, a synchronous motor having an operating coil for driving the same having a magnetizable plate therein, a spring motor, an escapement to control the operation of said spring motor, a pendulum for timing said escapement, an armature adapted to be attracted by the magnetizable plate and having an arm to intercept the movement of said pendulum, and means operable by the stray flux of the operating coil of the motor for obstructing the movement of said pendulum.

RICHARD H. WHITEHEAD.